US012769717B1

(12) United States Patent
Bono et al.

(10) Patent No.: US 12,769,717 B1
(45) Date of Patent: Oct. 20, 2026

(54) EXTENDING A PARALLEL FILE SYSTEM WITH A VECTOR DATABASE ABSTRACTION LAYER

(71) Applicant: Dell Products, L.P., Round Rock, TX (US)

(72) Inventors: Jean-Pierre Bono, Westboro, MA (US); Xiangping Chen, Sherborn, MA (US); Himabindu Tummala, South Grafton, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 19/185,576

(22) Filed: Apr. 22, 2025

(51) Int. Cl.
*G06F 16/22* (2019.01)
*G06F 16/18* (2019.01)
*G06F 16/2458* (2019.01)

(52) U.S. Cl.
CPC ...... *G06F 16/2237* (2019.01); *G06F 16/1858* (2019.01); *G06F 16/2246* (2019.01); *G06F 16/2471* (2019.01)

(58) Field of Classification Search
CPC ............. G06F 16/1858; G06F 16/2237; G06F 16/2246; G06F 16/2471; G06F 16/256; G06F 16/27; G06F 16/278; G06F 16/3347
See application file for complete search history.

(56) References Cited

U.S. PATENT DOCUMENTS

| | | | | | |
|---|---|---|---|---|---|
| 12,511,322 | B1 * | 12/2025 | Zhang | ................. | G06F 16/3347 |
| 2019/0272341 | A1 * | 9/2019 | Lu | ....................... | G06F 16/3347 |
| 2021/0073208 | A1 * | 3/2021 | Wong | ................ | G06F 16/24539 |
| 2024/0086408 | A1 * | 3/2024 | Xie | ..................... | G06F 16/2237 |
| 2024/0427784 | A1 * | 12/2024 | Rosendahl | ........ | G06F 16/24552 |
| 2025/0190461 | A1 * | 6/2025 | Madisetti | ............ | G06F 16/3329 |
| 2025/0284678 | A1 * | 9/2025 | Saha | ................... | G06F 16/2237 |
| 2025/0284694 | A1 * | 9/2025 | Benadjaoud | .......... | G06F 16/245 |
| 2025/0299018 | A1 * | 9/2025 | Kulkarni | ................ | G06N 3/092 |
| 2026/0023750 | A1 * | 1/2026 | Butterworth | ...... | G06F 16/24578 |

* cited by examiner

*Primary Examiner* — James E Richardson
(74) *Attorney, Agent, or Firm* — Amin, Turocy & Watson, LLP

(57) ABSTRACT

A parallel file system (PFS) can be enhanced with a vector database abstraction layer (VDAL) to manage both data objects and their corresponding vector embeddings. An associated metadata server can be employed to track how these data objects, embeddings, and vector indexes are organized, enabling parallel operations across multiple shards or nodes. The VDAL can store or generate embeddings in-band or out-of-band, build vector indexes using B-tree directories, and maintain ACID-compliant transactions for updates. By leveraging tagging, partial result merging, and load-balancing strategies, the VDAL can coordinate parallel ingestion and similarity queries in a unified, scale-out environment.

20 Claims, 11 Drawing Sheets

EXTENDING A PARALLEL FILE SYSTEM WITH A VECTOR DATABASE ABSTRACTION LAYER

BACKGROUND

A vector database is a specialized storage system designed to efficiently handle and query high-dimensional vector data, commonly used in artificial intelligence (AI) and machine learning (ML) applications for fast and accurate data retrieval. Vector databases store pieces of information as vectors, enabling similarity searches based on distance metrics, which can be useful for powerful AI models such as generative AI.

Another type of storage system is a parallel file system. Parallel file systems can be utilized in large-scale environments to store data across multiple nodes or shards that can be separately accessed in parallel for increased read and write throughput.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
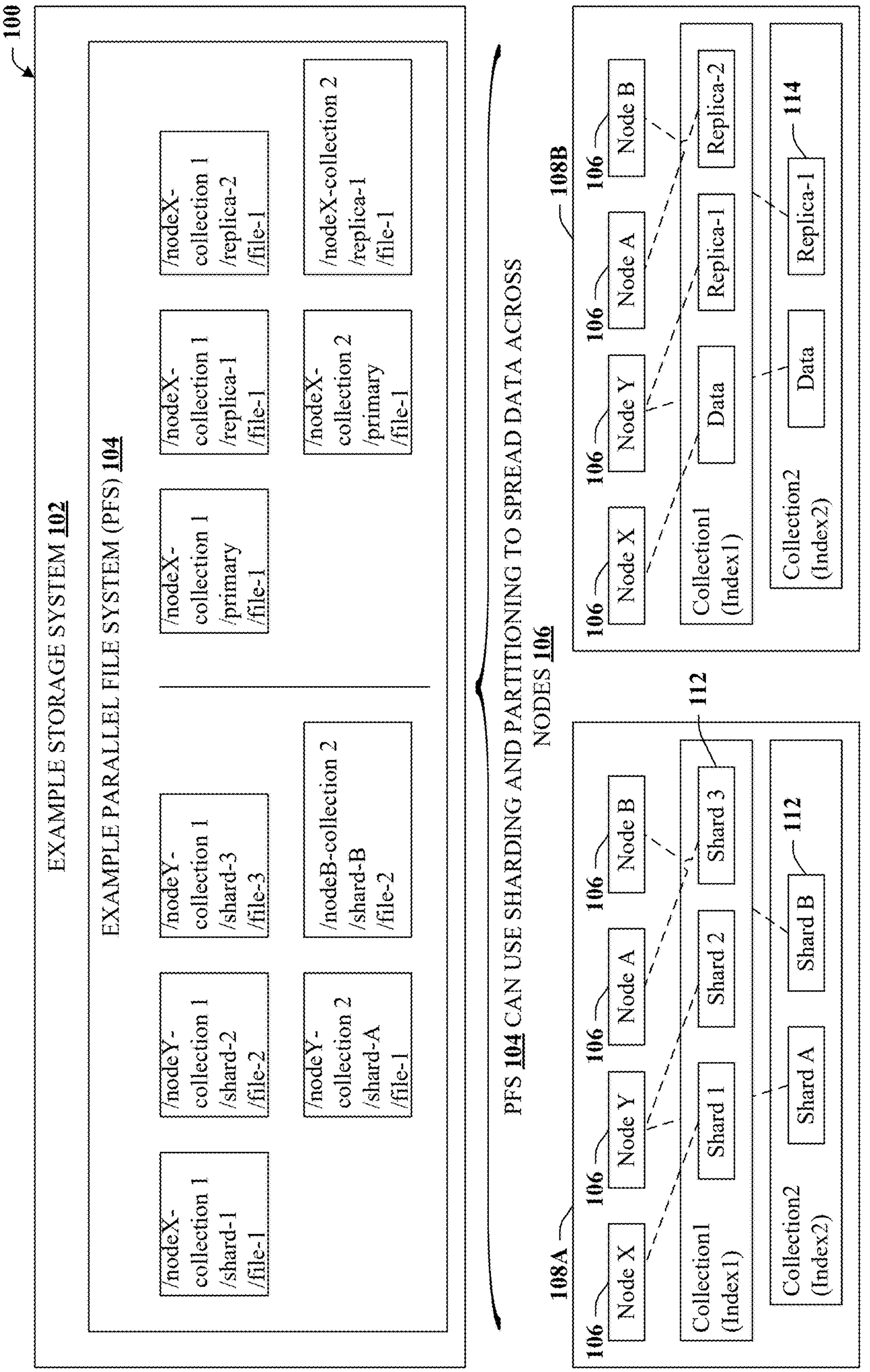
FIG. 1 shows a schematic block diagram illustrating an example storage system having an example parallel file system (PFS) that uses sharding and partitioning to spread data across associated nodes in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

To provide additional context, consider FIG. 1. FIG. 1 shows a schematic block diagram 100 illustrating an example storage system 102 having an example parallel file system (PFS) 104 that uses sharding and partitioning to spread data across associated nodes 106 in accordance with certain embodiments of this disclosure.

In some embodiments, sharding and partitioning can be viewed as two related techniques for subdividing a dataset across multiple logical or physical resources. Although these two terms can sometimes overlap in practice, each can emphasize different aspects of distributing data.

For example, sharding can refer to a process that splits a larger dataset into smaller, more manageable chunks called "shards," examples of which are illustrated as shard 112. Each shard 112 can be stored on a separate node 106 or storage device within a cluster, and each shard 112 can contain a distinct subset of data.

One goal of sharding can be to balance load and enhance throughput. For instance, by placing each shard 112 on a specific server or node 106, read and write operations can occur in parallel, thereby improving overall performance and scalability. Shards 112 can be designed to minimize or reduce overlap in data so that each server primarily handles a unique portion of the dataset. This approach can reduce contention and can simplify index management, especially when each shard 112 focuses on a dedicated subset of the dataset.

Partitioning can relate to a broader concept that involves dividing data into multiple parts or partitions 108 (e.g., example partitions 108A and 108B are illustrated) according to one or more partitioning rules. These rules can involve ranges of values (e.g., date ranges), hash functions that distribute values evenly, or other criteria (e.g., geographic location).

One goal of partitioning can be so that partitions 108 can be used to cluster related data in a way that can optimize queries and can reduce the amount of data scanned during a given operation. For instance, storing time-series data in date-based partitions can limit the scope of a query to recent partitions.

While sharding can typically refer to splitting a dataset for distributed storage across nodes 106, partitioning can apply both within a single node 106 and across multiple nodes 106. Partitions 108 can also be used for data lifecycle policies or tiering, which can migrate older partitions to lower-cost storage and keep newer, more active partitions on high-performance storage.

In many large-scale systems, a sharding mechanism can incorporate partitioning schemes. For instance, a shard 112 can itself be partitioned, or multiple shards 112 can each host multiple partitions 108. This arrangement can help balance load effectively while giving granular control over query optimization.

Both techniques can enable parallel processing and can help accommodate growing data volumes without overburdening individual servers. These PFS techniques can also facilitate geographical distribution, with different shards 112 or partitions 108 residing in multiple data centers. Both techniques can work together to handle large datasets in a scalable and efficient manner and can be used to optimize data organization, query performance, and storage management.

While FIG. 1 focuses on an example PFS 104, another type of storage system 102 can be a vector database. The emergence of vector databases has resulted in near-ubiquitous trend of using vector databases for addressing the demands of generative AI (GenAI). Vector databases can provide fast and accurate similarity and semantic searches through vector embeddings and vector indexing.

Vector databases are expected to support large datasets that encapsulate vector embeddings and possibly part of the raw data. Vector databases are expected to scale loading, indexing, and querying logic to meet performance needs of the applications. One of the ways these vector databases implement a scale out strategy is implementing different indexing mechanism like hierarchical navigable small world (HNSW) and disk approximate nearest neighbor (ANN), and further by supporting different query attributes like filtering and ranking.

In more detail, disk ANN can relate to a graph-based algorithm that allows for efficient ANN search on datasets too large to fit entirely in memory. Disk ANN can leverage disk storage to handle massive datasets, storing most of the index on disk while keeping a small, frequently accessed portion in memory. Disk ANN can use a caching mechanism to keep recently accessed nodes in memory, reducing repeated disk access. This approach can ensure that even with limited RAM, the system can handle large datasets by trading off some speed due to disk latency for scalability.

HNSW can relate to another graph-based ANN algorithm that builds a hierarchical representation of the index in memory. HNSW can use a layered, hierarchical graph structure to speed up the search process by quickly narrowing down the relevant area and refining the results for accuracy. HNSW relies on significant memory to manage multiple layers and maintain neighbor connections, ordinarily making it less suitable for large-scale datasets that do not fit in memory. However, as will be seen below, HNSW can be much more amenable for large-scale datasets when also leveraging PFS attributes.

Still referring to FIG. 1, PFS 104 can be structured into partitions 108 and shards 112 for computational scaling by distributing these segments across various nodes 106 for parallel processing. When using network attached file storage or another storage system, shards 112 and replicas 114 can manifest as distinct files located in separate directories.

Thus, PFS 104 can be designed to efficiently store large volumes of complex, unstructured data, and scale to trillions of files and objects. PFS 104 can feature an internal, data distribution logic, indexing and tagging infrastructure that supports metadata storage, including vector indexes, for swift retrieval. This architecture can be further extended to build a vector database abstraction layer (V DAL) that can support vector database functions to facilitate fast and accurate similarity searches. Consequently, it can be readily appreciated that PFS 104 is ideally positioned to provide high-performance, scalable vector database services for AI or other suitable applications, for example, significantly streamlining I/O for training and inference data flows.

Accordingly, vector database scale-out strategies (e.g., disk ANN, HNSW, . . . ) can be incorporated into PFS 104 scale-out strategies (e.g., partitioning, sharding, . . . ). For example, with reference to partition 108A, PFS 104 can spread data across nodes 106 so all HNSW can be in-memory. In some cases, high availability may not be available in this deployment. With reference to partition 108B, replicate data can be spread across nodes 106 in order to achieve high query throughput and high availability.

Hence, the disclosed subject matter can relate to adding or incorporating a VDAL into a PFS, such as PFS 104. At a high-level perspective, such can operate to add specialized vector database capabilities or functionality to a PFS. While a given PFS can store data for many use cases, the PFS does not inherently provide the dedicated vector-indexing and similarity-query functionality of existing vector database. Likewise, existing vector databases do not contemplate certain PFS capabilities or functionality such as sharding and partitioning.

A PFS is normally designed to scale out general file and object I/O, store metadata for unstructured data, and handle parallel read/writes. While existing PFS solutions can act as a storage layer underneath a separate vector database, the PFS of such solutions does not inherently handle high-level vector indexing or similarity-query coordination.

Thus, certain techniques detailed herein can relate to modifying or extending a PFS to incorporate vector-indexing logic and similarity-query coordination, functionality normally found only in specialized vector databases. Such can be accomplished by adding a VDAL to the PFS. In that regard, by folding these capabilities into the PFS, the system can avoid duplication resulting from having a separate vector database running on top of a PFS, can reduce overhead, and can leverage the PFS's inherent scalability for large-scale vector data.

In some embodiments, the VDAL enhanced PFS can function as a vector database, whereas previously one relied on an external vector database to capture that functionality. Meanwhile, the VDAL enhanced PFS can maintain ordinary PFS functionality as well.

In some embodiments, such as for deployments that use a PFS alongside a separate vector database, the disclosed subject matter can effectively render the V DAL enhanced PFS a more efficient solution by merging the vector database logic directly into the file system layer.

Accordingly, the disclosed subject matter can relate to enhancing a PFS (e.g., by adding a VDAL comprising additional indexing, querying, and distribution logic) so that the VDAL enhanced PFS can serve as both a scalable storage layer and a vector database, potentially much more efficiently than a two-layer solution comprising a conventional PFS+an external vector database. Like certain other PFS implementations, a VDAL enhanced PFS can be designed to efficiently store large volumes of complex, unstructured data potentially scaling to trillions of files and objects or more. The VDAL enhanced PFS can feature internal data distribution logic and indexing and tagging infrastructure that can support metadata storage, including vector indexes, for swift retrieval. This architecture can be further extended to build and leverage the V DAL to support vector database capabilities that facilitate fast and accurate similarity searches. Consequently, a VDAL enhanced PFS can be ideally positioned to provide high-performance, scalable vector database services for AI applications or other applications, which can operate to significantly streamline I/O for training and inference data flows, which is further detailed in the ensuing figures.

Example Systems

Figure 2:
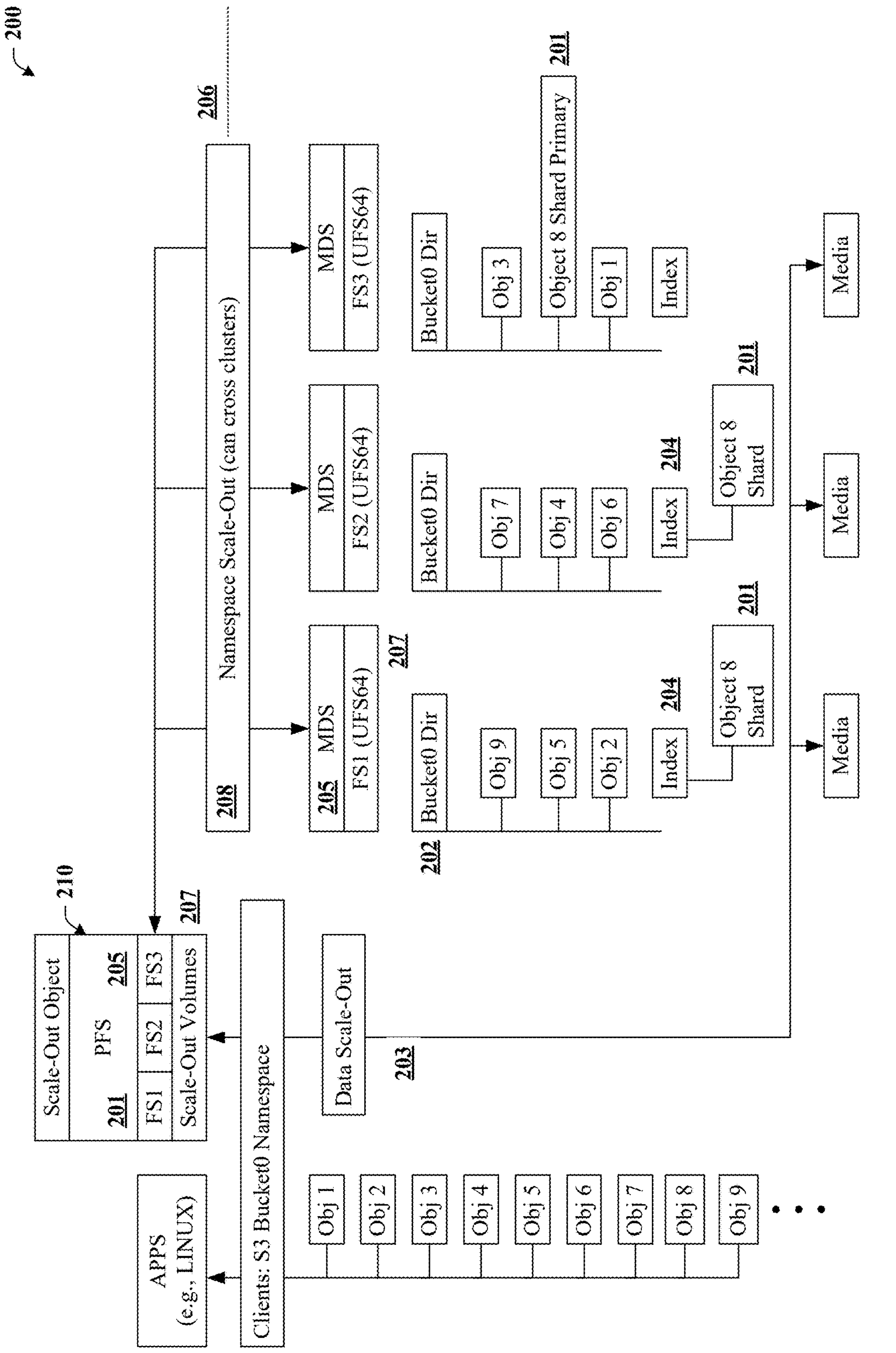
FIG. 2 depicts a schematic block diagram illustrating an example PFS object scale-out architecture in accordance with certain embodiments of this disclosure.

FIG. 2 depicts a schematic block diagram 200 illustrating an example PFS 210 object scale-out architecture in accordance with certain embodiments of this disclosure. In some embodiments, this example can relate to a VDAL enhanced PFS 210.

It is appreciated that PFS 210 can be configured to construct the foundational elements for distributed storage by implementing techniques such as sharding or partitioning of a data collection. In addition, PFS 210 can provide an indexing mechanism, such as a B-tree structure, that organizes and indexes different documents within the collection based on their content. Through this distributed storage architecture, PFS 210 can support distributed query execution across the data collection and can be designed to achieve high query-per-second (QPS) performance.

In the context of scale-out, the several instances of reference numeral 201 are intended to illustrate that PFS 210 hash object keys can be leveraged to determine an index for file systems, which in this non-limiting example is a universal flash storage with a 64-bit interface (UFS64). Hence, objects can be sharded across UFS64 file systems to hash I/O offsets or the like. In one example, the default shard size can be 4 megabytes (M B).

Reference numeral 202 is intended to illustrate that each UFS64 instance can support B-tree-based directory structures, which can accommodate very large object counts (e.g., up to 100 million or more), while maintaining efficient access times, such as sub-millisecond lookup latency. Such can enable high-speed metadata operations even at massive scale.

Reference numeral 203 is intended to illustrate that object data transactions, such as reads, writes, and updates, can be conducted across a high-speed interconnect or fabric interface to the physical storage media. This approach can abstract away storage media locality and enable consistent performance across a distributed storage infrastructure.

Reference numeral 204 is intended to illustrate the indexing layer of PFS 210 can scale proportionally with the number of UFS64 instances deployed. As additional UFS64 nodes or instances are added, the index can expand correspondingly, maintaining consistent performance and supporting large-scale, distributed object sets.

Reference numeral 205 is intended to illustrate that a suite of advanced, scale-out-optimized data services can be supported. These services can include end-to-end encryption for secure data at rest and in transit, integrity checks for data validation, inline deduplication to reduce storage footprint, tiering to lower-cost storage (e.g., quad-level cell (QLC) flash) or cloud-based cold storage, and snapshot capabilities at both the bucket and object levels to support versioning and backup workflows.

Reference numeral 206 is intended to illustrate that that a metadata server (MDS) in the system can be dynamically and seamlessly migrated within the storage cluster to accommodate changes in cluster topology, such as expansion, contraction, or non-disruptive upgrades (NDU). The system can support flexible MDS deployment models, such as one-to-many mappings between servers and MDS instances, as well as between MDS instances and UFS64 file systems. This flexibility allows for adaptive metadata distribution and improved resiliency.

Reference numeral 207 is intended to highlight that the system can support distributed, erasure-coded (EC) protection mechanisms, enabling scale-out volumes with built-in redundancy. Techniques similar to traditional redundant array of independent disks (RAID) configurations, such as RAID60, RAID10, or RAID0, can be adapted and applied across the distributed fabric, offering a balance between performance, fault tolerance, and storage efficiency.

Reference numeral 208 is intended to illustrate that the architecture can support reconciled scale-out functionality across various storage access paradigms, including portable operating system interface (POSIX)-compliant file access, memory-mapped (M MAP) access models, traditional network-attached storage (NAS) protocols, and object-based interfaces. This convergence can enable unified access across diverse workloads without compromising scalability or consistency.

By leveraging the distribution logic of PFS 210, query operations, such as vector-based searches initiated by the VDAL, can be executed in parallel across multiple file systems and storage nodes. In this configuration, queries can be directed through one or more metadata servers, enabling highly parallelized data access.

Furthermore, the system can expose an extended interface, such as a non-structured query language (non-SQL) interface, to allow applications to interact with PFS 210 not only as a persistence layer but also as a database-like service. This integrated interface can enable applications to perform search, filtering, and analytic operations directly within the storage layer, eliminating the need for external indexing, mapping, or compute layers typically required by separate vector databases. As a result, the system can reduce latency, simplify architecture, and enhance performance for a broad range of use cases, including machine learning, analytics, and content retrieval.

Figure 3:
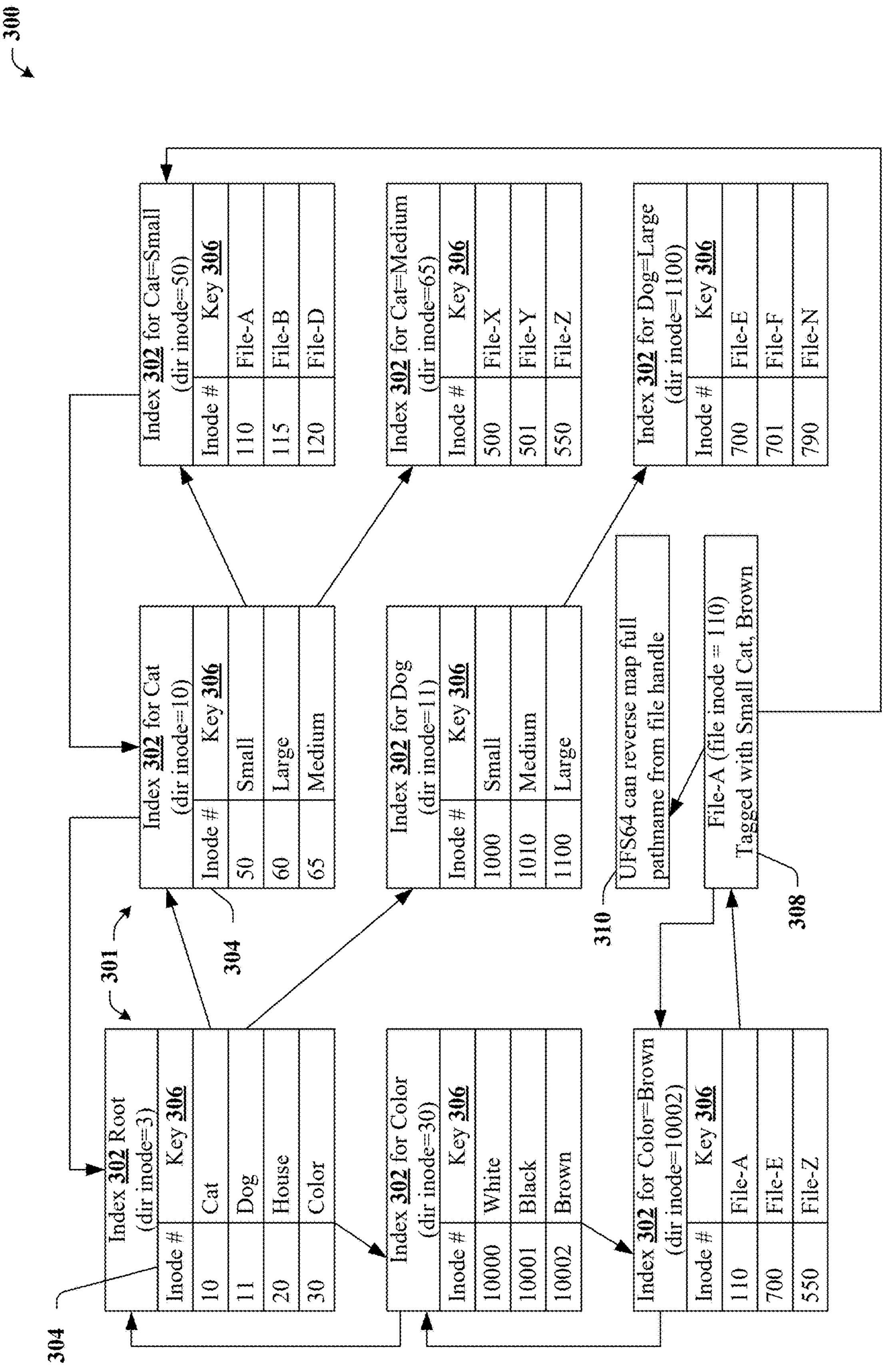
FIG. 3 depicts a schematic block diagram illustrating an example of vector database abstraction layer (V DAL) enhanced PFS indexing and tagging that can facilitate a hybrid search in accordance with certain embodiments of this disclosed subject matter.

FIG. 3 depicts a schematic block diagram 300 illustrating an example of VDAL enhanced PFS 210 indexing and tagging that can facilitate a hybrid search in accordance with certain embodiments of this disclosed subject matter. As shown, each file object (e.g., each data element) can be assigned one or more tag 301. In some embodiments, a given file object can be tagged with 64 or more of these tags 301, and each tag 301 can correspond to a category or descriptor. Each tag 301 can include an inode number 304 (or other identifier), a key 306, and an index 302 that can facilitate indexing for the respective file object.

In some embodiments, a tag 301 can be stored as a directory entry (e.g., root-level tag 301 can be indexed via an associated directory inode, such as inode 3), which can map to various example keys 306 (e.g., “Cat,” “Dog,” “House,” and “Color”), each associated with a corresponding inode number 304. If a file object is tagged as “Cat,” the system can reference another directory inode (e.g., inode 10) to locate or manage further keys 306 relevant to that file object. This hierarchical or linked structure can permit more granular sub-tagging, improving data organization in VDAL enhanced PFS 210.

At reference numeral 308, FIG. 3 shows how File-A can be tagged with “Small,” “Brown,” and “Cat.” In some embodiments, an inode size can be 4 kilobytes or more, allowing storage of these tags 301 directly within inode data for File-A. If additional storage is needed beyond what is supported by the inode itself, a named-stream can be used to persist the tagging information in conjunction with the file object. At reference numeral 310, the schematic block diagram 300 indicates how a storage device or file system (e.g., UFS64) can reverse map a full pathname from a file handle, allowing a process to retrieve or confirm a file object's location even when only the file handle or inode number 304 is known.

In certain embodiments, the tagging functionality described in FIG. 3 can offer additional metadata for organizing data objects, supplementing the vector-based capabilities described elsewhere. Such tagging can be used in further operations to combine semantic and attribute-based queries, supporting a hybrid search approach in V DAL enhanced PFS 210.

Figure 4:
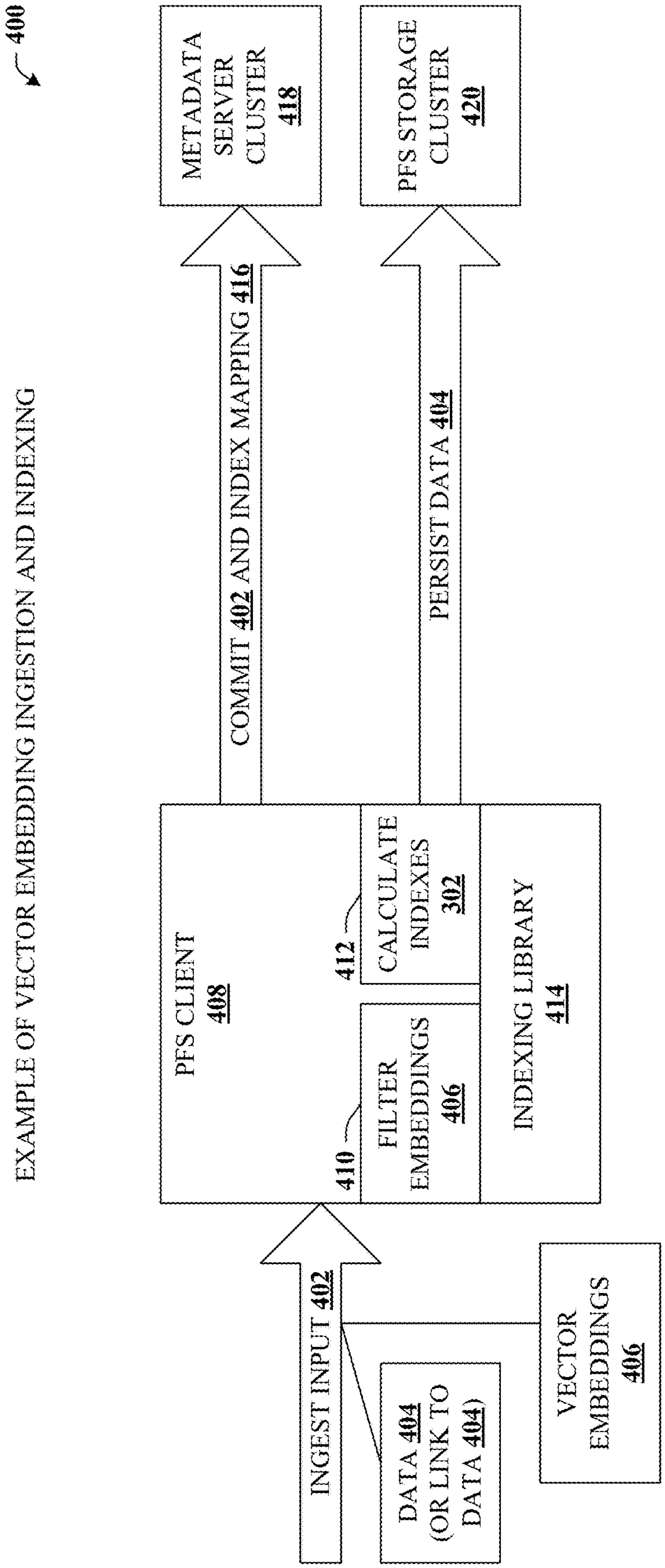
FIG. 4 depicts a schematic block diagram illustrating an example of vector embedding ingestion and indexing in accordance with certain embodiments of this disclosed subject matter.

FIG. 4 depicts a schematic block diagram 400 illustrating an example of vector embedding ingestion and indexing in accordance with certain embodiments of this disclosed subject matter. PFS client 408 can receive input 402, which can comprise data 404 or, in some scenarios, a link such as a uniform resource locator or uniform resource identifier to data 404. In some embodiments, data 404 can be text, images, audio files, or other forms of unstructured or semi-structured data that can be stored in a parallel file system.

In some embodiments, input 402 can also comprise vector embeddings 406. In other embodiments, if vector embeddings 406 are not included in input 402, PFS client 408 can generate vector embeddings 406 in an in-band or out-of-band manner as further detailed below in connection with vector indexes 302. An in-band approach can generate vector embeddings 406 when data 404 is first ingested, and an out-of-band approach can scan data 404 after it has been stored to produce the vector embeddings 406. Each embedding in vector embeddings 406 can be a high-dimensional representation of data 404, often derived through machine learning or artificial intelligence techniques that map features of data 404 to numeric values in a vector space.

At reference numeral 410, PFS client 408 can filter vector embeddings 406 based on certain policies or criteria, which can include removing or refining certain dimensions of vector embeddings 406 or applying thresholds and rules to refine vector embeddings 406. At reference numeral 412, PFS client 408 can calculate indexes 302, which can include determining how vector embeddings 406 will be organized or searched. Such can facilitate similarity queries for vector embeddings 406. In both cases, PFS client 408 can rely on indexing library 414, which can be integrated into PFS client 408 or implemented as a separate module accessible through a defined interface. Indexing library 414 can support diverse indexing strategies, such as approximate nearest neighbor techniques or B-Tree-based indexes, for managing vector embeddings 406.

At reference numeral 412, PFS client 408 can calculate vector indexes 302 from vector embeddings 406 by examining the numeric relationships among dimensions in each vector embedding 406. This process can involve techniques such as dimensionality reduction, distance metric selection, or approximate nearest neighbor calculations that convert the numeric features in vector embeddings 406 into index entries suitable for similarity searching. In some embodiments, the calculation of vector indexes 302 can occur in an in-band manner, where PFS client 408 computes and stores vector indexes 302 alongside data 404 at the time data 404 is ingested, thereby ensuring that each new file object is immediately associated with the relevant vector indexing information.

In other embodiments, an out-of-band approach can be used, in which PFS client 408 or a background agent scans data 404 and any associated vector embeddings 406 already present in the parallel file system, then calculates or updates indexes 302 afterward without altering ongoing ingestion processes. Both approaches can rely on indexing library 414 to manage the underlying index-building algorithms, which can be B-Tree-based, graph-based, or other structures that map vector embeddings 406 to logical references for quick retrieval during similarity queries.

PFS client 408 can then commit input 402 and an index mapping 416 to metadata server cluster 418. A commit can be an operation that writes or updates metadata records in metadata server cluster 418. These records can include references linking vector embeddings 406 to data 404, along with pointers indicating how vector indexes 302 are organized or distributed. Index mapping 416 can be a data structure specifying relationships between data 404, vector embeddings 406, and indexes 302, which can be stored by metadata server cluster 418 for later retrieval or updates.

PFS client 408 can persist data 404 to PFS storage cluster 420. This persisted data 404 can include the underlying files, objects, or other forms of stored content, along with associated vector embeddings 406 if those embeddings are to be maintained in or near the same physical location. In some embodiments, parallel file system processes can replicate or shard data 404 and vector embeddings 406 across different nodes for load balancing or fault tolerance.

By distributing vector indexes 302 across multiple shards, PFS client 408 can manage shards or partitions of vector embeddings 406 so that ingestion and querying can occur in parallel. This approach can rely on B-Tree directory structures to organize similarity references, grouping similar vector indexes 302 in a way that can reduce query time by taking advantage of locality within the index. The process can be carried out under ACID transactions to ensure atomicity, consistency, isolation, and durability when adding or modifying vector embeddings 406 and vector indexes 302. A tomicity can ensure that partial updates do not corrupt data 404 or the index mapping 416. Consistency can validate that updates follow the system's constraints for referencing and partitioning. Isolation can permit multiple indexing or ingestion processes to proceed without interfering with each other, and durability can preserve changes even in the event of node or hardware failures. This integrated design can provide scalable, high-throughput handling of both data 404 and vector embeddings 406.

Figure 5:
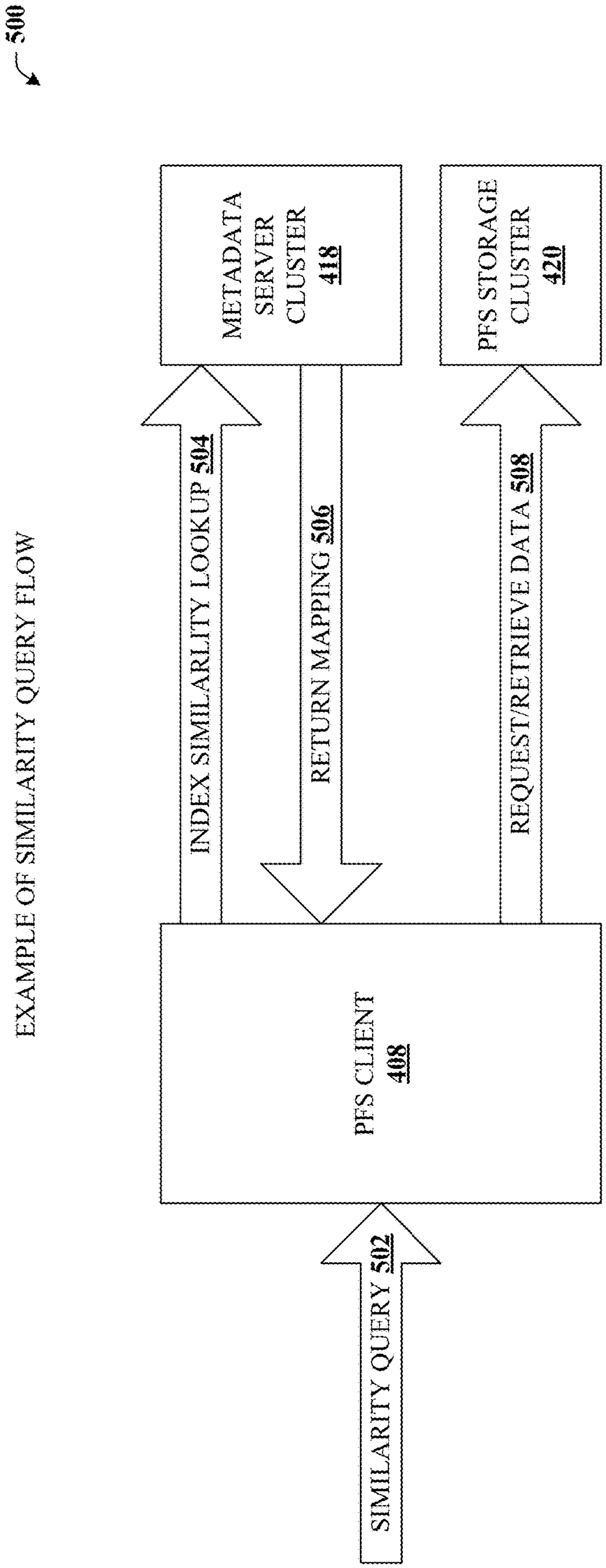
FIG. 5 depicts a schematic block diagram illustrating an example of a similarity query flow in accordance with certain embodiments of this disclosed subject matter.

FIG. 5 depicts a schematic block diagram 500 illustrating an example of a similarity query flow in accordance with certain embodiments of this disclosed subject matter. PFS client 408 can receive similarity query 502, which can specify one or more vector embeddings or reference a particular data object for comparison. In some embodiments, the query can include parameters such as a distance threshold or a maximum number of results. PFS client 408 can send index similarity lookup 504 to metadata server cluster 418, referencing vector indexes 302 that were built and maintained as described above. Metadata server cluster 418 can traverse its stored indexing structures, which can include B-Tree directory structures, approximate nearest neighbor graphs, or other data constructs, to locate entries that match the requested similarity criteria. Metadata server cluster 418 can return mapping 506 to PFS client 408, indicating which file objects correspond to the matched vector embeddings. Mapping 506 can contain references such as inode numbers, file handles, or other identifiers that can link to relevant data objects.

PFS client 408 can then request or retrieve data 508 from PFS storage cluster 420, using the references provided by metadata server cluster 418. The retrieval can involve reading data objects or their associated vector embeddings 406, which can be stored across multiple shards for parallel access. In scenarios where ACID transactions are used, the updates or lookups related to vector indexes 302 can be carried out so that partial or conflicting queries do not affect the results of ongoing similarity operations. Any local or remote nodes that are part of PFS storage cluster 420 can supply data objects that meet the similarity criteria, enabling PFS client 408 to aggregate the results and present them to a requesting process. This distributed query flow can reduce latency by allowing parallel index lookups and data retrieval, and can facilitate high-throughput operations on large-scale vector embeddings and data objects.

Figure 6:
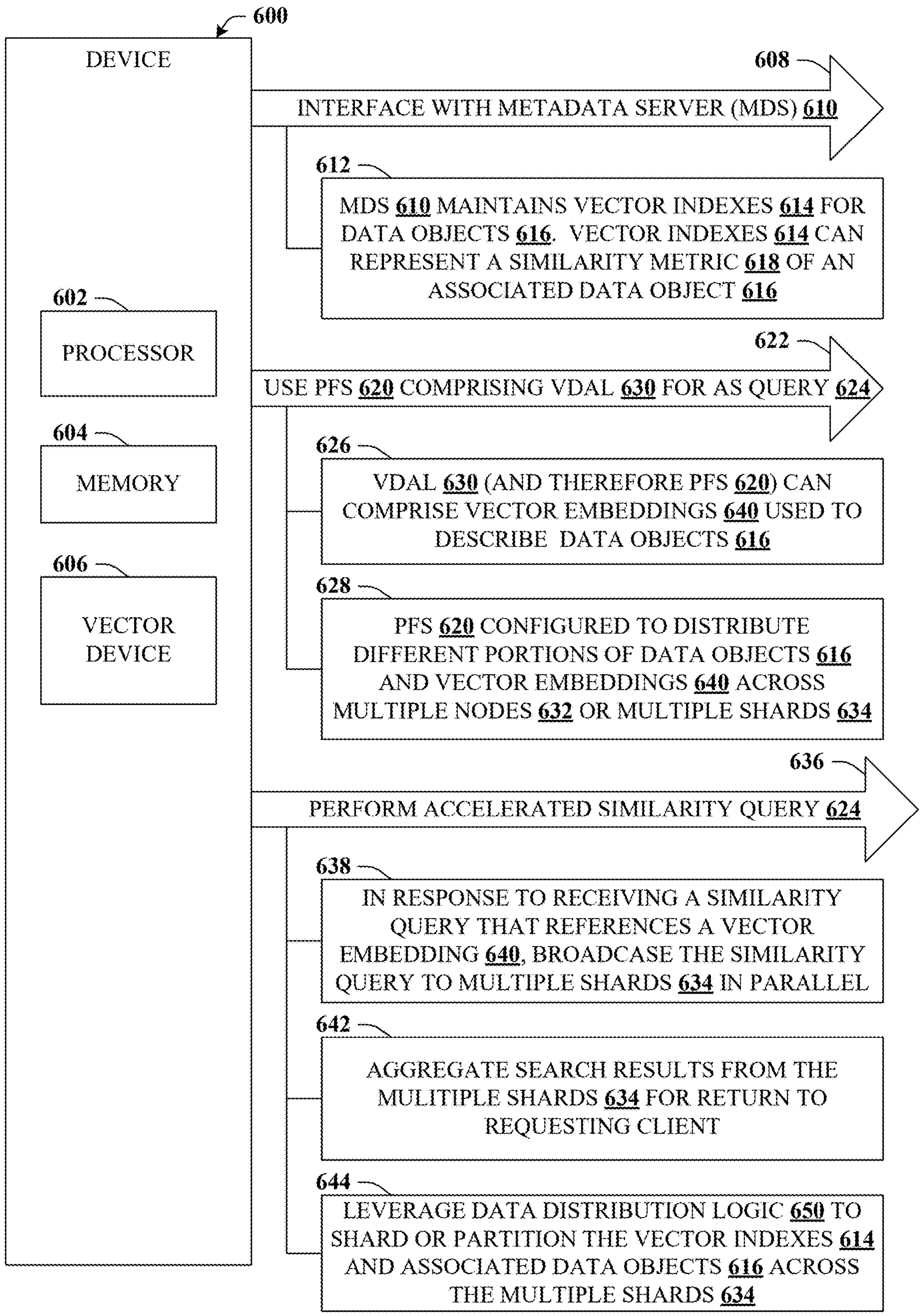
FIG. 6 depicts a schematic block diagram illustrating an example device that can leverage a PFS having an integrated V DAL to shard or partition vector indexes in accordance with certain embodiments of this disclosure.

With reference now to FIG. 6, a schematic block diagram illustrating an example device 600 that can leverage a PFS 620 having an integrated VDAL 630 to facilitate sharding or partitioning of vector indexes 614 in accordance with certain embodiments of this disclosure. In that regard, device 600 can, in some embodiments, be an extended PFS or can be in communication with an extended PFS.

Device 600 can comprise at least one processor 602 that, potentially along with vector device 606, can be specifically configured to perform functions associated a VDAL or with generating vectors for use with the VDAL. Device 600 can also comprise at least one memory 604 that stores executable instructions that, when executed by the at least one processor 602, can facilitate performance of operations. Processor(s) 602 can be a hardware processor having structural elements known to exist in connection with processing units or circuits, with various operations of processor 602 being represented by functional elements shown in the drawings herein that can require special-purpose instructions, for example, stored in memory 604 and/or vector device 606. Along with these special-purpose instructions, processor 602 and/or vector device 606 can be a special-purpose device. Further examples of the memory 604 and processor 602 can be found with reference to FIG. 11. It is to be appreciated that device 600 or computer 1102 can represent a server device or a client device of a PFS or other storage platform and computer 1102 can be used in connection with implementing one or more of the systems, devices, or components shown and described in connection with FIG. 6 and other figures disclosed herein.

As illustrated at reference numeral 608, device 600 can interface with metadata server (MDS) 610, which can be the same or similar as MDS detailed in connection with FIG. 2. As illustrated at reference numeral 612, MDS 610 can maintain vector indexes 614 (e.g., vector indexes 302) for data objects 616. Data objects 616 can be any suitable data (e.g., text, images, . . . ) and vector indexes 614 can, for example, represent a similarity metric 618 of an associated data object 616. In some embodiments, vector indexes 614 can be derived or calculated from vector embeddings 640 (e.g., vector embeddings 406).

In other words, MDS 610 can maintain records indicating how data objects 616, vector embeddings 640, and vector indexes 614 are organized within a parallel file system such as PFS 620 (e.g., PFS 210). MDS 610 can store directory entries, inode numbers, shard assignments, or other identifiers that link data objects 616 and their associated indexes 614. By storing and tracking relationships between vector embeddings 640 and data objects 616, MDS 610 can manage references that facilitate parallel queries and updates. MDS 610 can also employ data structures such as B-Tree directories to group or organize vector indexes, which can help reduce query times by preserving locality of references. Additionally, MDS 610 can coordinate with PFS client components and storage clusters to ensure that transactions involving newly ingested data, updated vector embeddings, or evolving index structures remain consistent and durable.

At reference numeral 622, device 600 can use PFS 620 comprising VDAL 630 for an accelerated similarity (AS) query 624. As indicated at reference numeral 626, VDAL 630, and therefore PFS 620, can comprise vector embeddings 640 used to describe data objects 616. As illustrated at reference numeral 628, PFS 620 can be configured to distribute different portions of data objects 616 and vector embeddings 640 across multiple nodes 632 or multiple shards 634.

VDAL 630 can be a specialized layer within PFS 620 that integrates vector-related functions, such as generating and storing vector embeddings 640, with core file system operations. VDAL 630 can manage relationships among data objects 616, vector embeddings 640, and vector indexes 614 by maintaining mappings (e.g., index mapping 416) in coordination with MDS 610. This structure can facilitate accelerated similarity queries 624 by allowing PFS 620 to locate relevant vector embeddings 640 across multiple nodes 632 or shards 634 in parallel. VDAL 630 can include interfaces or libraries for indexing and querying vector embeddings 640, leveraging machine learning algorithms or approximate nearest neighbor techniques to identify potential matches rapidly.

By uniting these indexing capabilities with the scale-out properties of PFS 620, V DAL 630 can enable high-throughput ingestion of new data objects 616, concurrent indexing operations, and efficient retrieval of query results. This can provide advantages such as reduced latency when performing distance comparisons or nearest-neighbor lookups, enhanced utilization of distributed storage and computing resources, and stronger consistency controls through ACID transactions that apply to both file operations and vector-related metadata updates, which are further detailed in connection with FIG. 7.

Hence, as indicated at reference numeral 636, device 600 can perform accelerated similarity query 624. In that regard, as indicated at reference numeral 638, accelerated similarity query 624 can be performed in response to receiving a similarity query that references vector embedding 640. Thus, in some embodiments, the similarity query can comprise data (e.g., data 404) such as data object 616 and an associated vector embedding 640. As indicated previously, in other embodiments, device 600 can operate to generate the vector embedding 640 from the received data object 616. Regardless, in response to the similarity query, device 600 can broadcast the similarity query to multiple shards 634 in parallel.

At reference numeral 642, device 600 can aggregate search results from the multiple shards 634 for return to the requesting client. At reference numeral 644, device 600 can leverage data distribution logic 650 to shard or partition the vector indexes 614 and associated data objects 616 across the multiple shards 634.

Data distribution logic 650 can represent a mechanism (e.g., in the context of PFS 620 extended with VDAL 630) by which data objects 616, vector embeddings 640, and vector indexes 614 are divided or shard-assigned across multiple nodes 632 or shards 634 in PFS 620. For example, data distribution logic 650 can analyze factors such as current load, data size, or balancing policies and can assign subsets of data to different nodes in a way that promotes parallel ingestion and retrieval. By managing how data is shared or partitioned, data distribution logic 650 can help sustain high-throughput operations, distribute storage usage efficiently, and coordinate transactions for both file system metadata and vector-based records.

Hence, the elements described in connection with FIG. 6 can collectively provide a system that distributes, indexes, and queries data objects 616 and vector embeddings 640 in a parallel file system environment. Device 600 can supply processing resources to orchestrate the ingestion of data objects 616 and the generation or retrieval of corresponding vector embeddings 640, while MDS 610 can manage the placement and referencing of vector indexes 614. PFS 620, which can include VDAL 630, can organize data objects 616 and vector embeddings 640 across multiple nodes 632 or shards 634 to support parallel operations. Such can operate to maintain scalable, high-throughput data distribution logic, storing vector embeddings 640, coordinating metadata and index updates, and answering similarity queries based on vector indexes 614.

Figure 7:
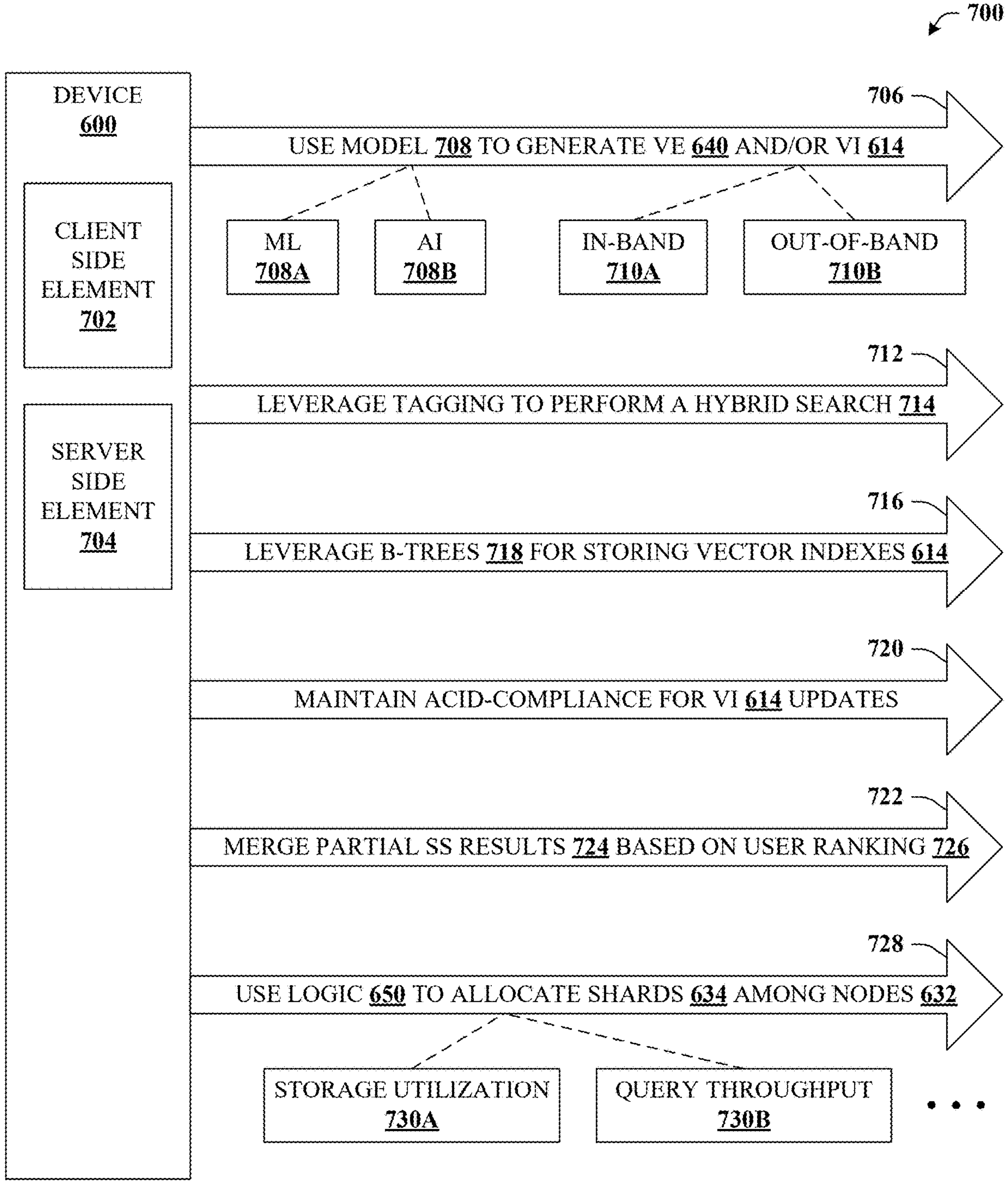
FIG. 7 depicts a schematic block diagram illustrating additional elements or embodiments of the example device that can leverage a PFS having an integrated VDAL to shard or partition vector indexes in accordance with certain embodiments of this disclosure.

Turning now to FIG. 7, a schematic block diagram 700 illustrates additional elements or embodiments of the example device 600 that can leverage a PFS having an integrated V DAL to shard or partition vector indexes in accordance with certain embodiments of this disclosure. For example, in this embodiment, device 600 is shown comprising client side element 702 and server side element 704. These elements 702, 704 can represent respective processes, interfaces, or sets of instructions that execute on or communicate with different parts of PFS 620.

Client side element 702 can reside on or communicate with a node associated with data ingestion, query initiation, or other client-facing operations. Client side element 702 can communicate with server side element 704 to coordinate storage placement or handle distributed file system logic. Server side element 704 can reside on or communicate with one or more nodes (e.g., nodes 632) or shards (e.g., shards 634) that store data objects 616 and vector embeddings 640, and can manage local indexing structures or caching mechanisms.

For example, client side element 702 can issue read or write requests, while server side element 704 can apply policies related to A CID transactions or shard assignments, potentially consulting MDS 610 for index mapping or metadata references. In some embodiments, client side element 702 can handle generation or refinement of vector embeddings 640 or filtering tasks, whereas server side element 704 can manage bulk data storage and replication, ensuring consistent updates to vector indexes 614. By segregating these roles across client side element 702 and server side element 704, PFS 620 can distribute both computational and storage tasks in a manner that supports scalable parallelism for vector-based operations.

At reference numeral 706, device 600 can use model 708 to generate vector embedding 640 and/or vector index 614. Model 708 can be a machine learning model 708A, an artificial intelligence model 708B, or any other suitable model capable of analyzing data objects 616 and producing vector embeddings 640 or subsequent indexing structures. Model 708 can operate in accordance with in-band technique 710A, in which vector embeddings 640 and vector indexes 614 are generated at or near the time data objects 616 are ingested, or out-of-band technique 710B, which can scan data objects 616 and any associated vector embeddings 640 after they have been stored in PFS 620.

In either scenario, device 600 can leverage model 708 to transform raw data into high-dimensional numeric representations or to derive similarity metrics that are subsequently stored as vector indexes 614 by server side element 704. This process can rely on any suitable distance metrics or algorithms, such as approximate nearest neighbor approaches, which can be keyed to data structures like B-Tree directories managed by MDS 610. By leveraging model 708 at reference numeral 706 in this manner, device 600 can support scalable, flexible generation of vector embeddings 640, ensuring that the parallel file system retains or updates relevant indexing data alongside the ingestion and ongoing management of data objects 616.

At reference numeral 712, device 600 can leverage tagging to perform a hybrid search 714. Tagging can involve annotating data objects 616 with descriptive labels (e.g., see FIG. 3) that can be stored alongside or within data objects 616 themselves. These tags can correspond to file metadata, user-defined categories, or other attributes, enabling device 600 to combine semantic similarity queries of vector embeddings 640 with attribute-based filters for a more refined hybrid search 714. In some embodiments, tagging can be persisted in MDS 610, which can store references linking tags to vector indexes 614 and data objects 616. By fusing this attribute-based perspective with vector embedding analysis, device 600 can perform hybrid search 714 that can rank or filter search results more precisely.

At reference numeral 716, device 600 can leverage B-Trees 718 for storing vector indexes 614. B-Trees 718 can organize index entries based on distance metrics, facilitating range-based lookups or approximate nearest neighbor searches for vector embeddings 640. In some scenarios, B-Trees 718 can group similar vector embeddings 640 in pages or nodes, preserving locality for search operations and thereby reducing the time needed to fetch relevant entries from MDS 610 or the storage clusters. This can be advantageous for large-scale data sets, as B-Trees 718 can limit the portion of the index that must be scanned for a given query.

At reference numeral 720, device 600 can maintain ACID-compliance for updates to vector index 614. In this context, atomicity can ensure that partial changes do not leave vector indexes 614 and corresponding references in an inconsistent state. Consistency can confirm that each update follows the system's schema or constraints. Isolation can provide that concurrent insertions or modifications to vector embeddings 640 do not interfere with each other's transactions. Durability can store updated records or indexes to non-volatile media so that data persists even in the event of a node failure. By maintaining ACID-compliance, device 600 can provide a stable environment in which vector embeddings 640 and vector indexes 614 are consistently tracked.

At reference numeral 722, device 600 can merge partial similarity search results 724 based on user rankings 726. Partial similarity search results 724 can include subsets of matching or near-matching vector embeddings 640 returned from multiple shards 634. Device 600 can aggregate and reorder these partial results based on user rankings 726, which can be rules, weights, or other criteria that reflect user preferences or relevance priorities. This merging process can occur at a client-facing node or at a coordinating service, enabling device 600 to return a final result set that balances mathematical similarity with user-defined ranking factors.

At reference numeral 728, device 600 can use data distribution logic 650 to allocate shards 634 among nodes 632. Such allocation can consider metrics like storage utilization 730A and query throughput 730B, as well as other parameters that characterize how much data is stored on each shard, how frequently queries are executed, or how busy each node 632 is. Data distribution logic 650 can redistribute shards 634 in real time or according to a schedule, helping device 600 sustain efficient parallel operations by balancing load across nodes 632. This can result in improved ingestion rates, reduced latency, and consistent performance for both read and write workloads associated with data objects 616 and vector embeddings 640.

Example Methods

Figure 8:
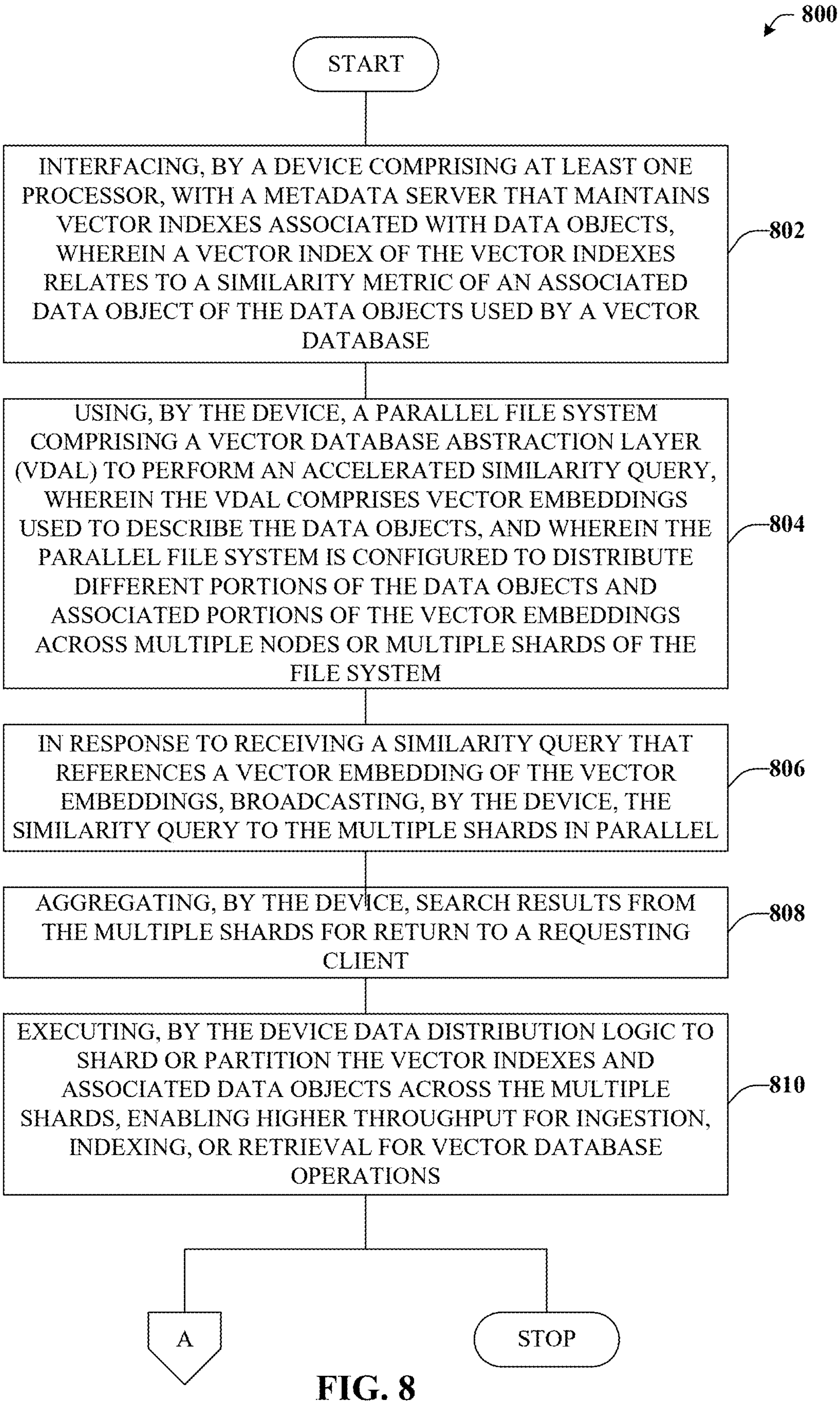
FIG. 8 illustrates an example method that can leverage a PFS having an integrated V DAL to facilitate sharding or partitioning of vector indexes in accordance with certain embodiments of this disclosure.
Figure 9:
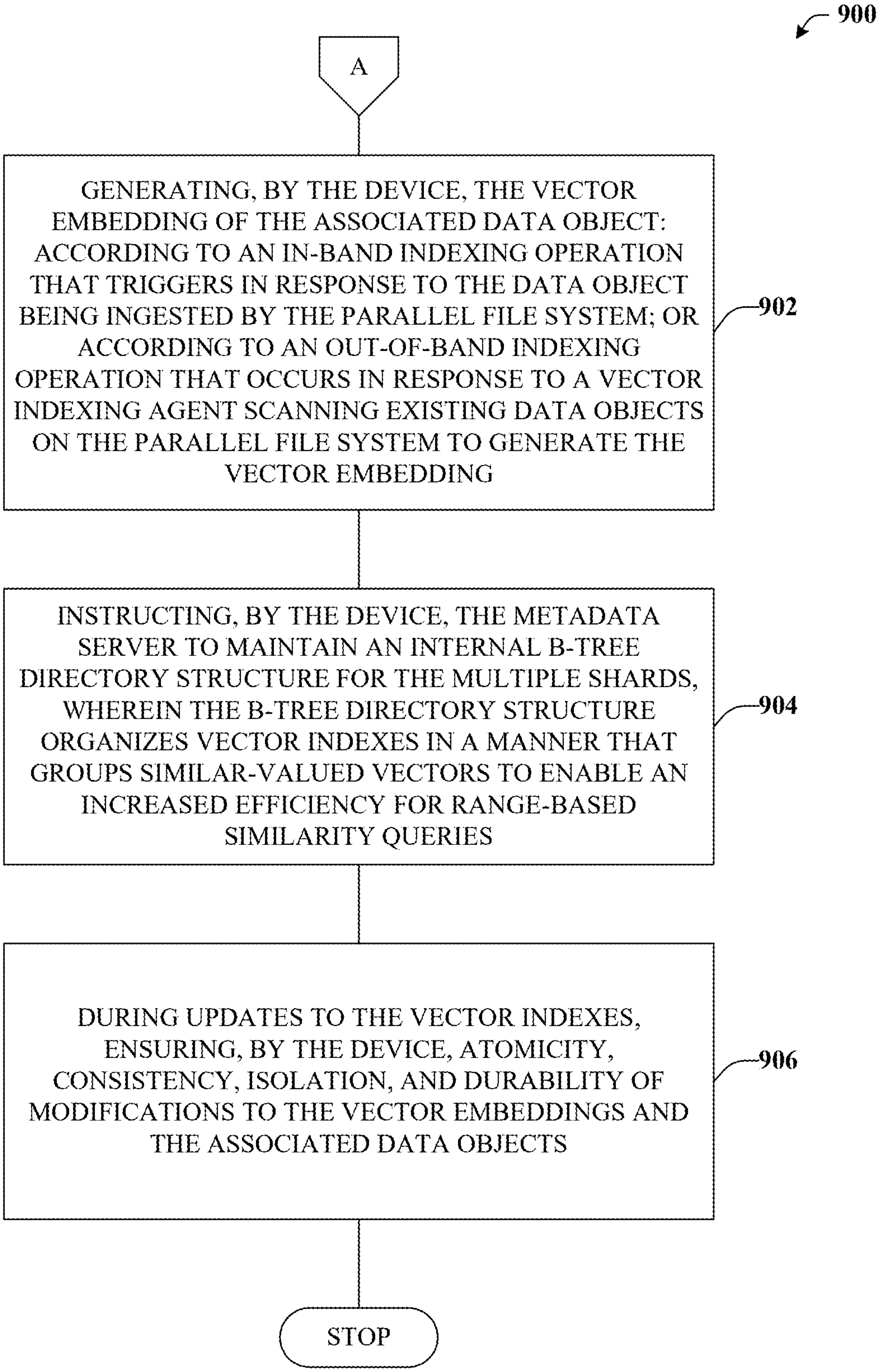
FIG. 9 illustrates an example method that can provide additional embodiments or elements relating to leveraging a PFS having an integrated VDAL to facilitate sharding or partitioning of vector indexes in accordance with certain embodiments of this disclosure.

FIGS. 8 and 9 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Referring now to FIG. 8, exemplary method 800 is depicted. Method 800 that can leverage a PFS having an integrated V DAL to shard or partition vector indexes in accordance with certain embodiments of this disclosure. While method 800 describes a complete method, in some embodiments, method 800 can include one or more elements of method 900, as illustrated by insert A.

At reference numeral 802, a device comprising at least one processor can interface with a metadata server. The metadata server can maintain vector indexes associated with data objects. A given vector index of the vector indexes can relate to a similarity metric of an associated data object of the data objects used by a vector database.

By way of non-limiting examples, the similarity metric can include Euclidean distance, cosine similarity, Manhattan distance, or other distance-based measures that can compare numeric vectors derived from data objects. For instance, Euclidean distance can calculate the square root of the sum of squared differences between each dimension of two vectors, whereas cosine similarity can compute the normalized dot product of two vectors to measure the angle between them. These or similar metrics can be specified within vector indexes to facilitate searching for data objects that share comparable patterns or features in the numeric space.

At reference numeral 804, the device can use a parallel file system comprising a vector database abstraction layer (V DAL) to perform an accelerated similarity query. The VDAL can comprise vector embeddings used to describe the data objects. The parallel file system is configured to distribute different portions of the data objects and associated portions of the vector embeddings across multiple nodes or multiple shards of the file system.

At reference numeral 806, in response to receiving a similarity query that references a vector embedding of the vector embeddings, the device can broadcast the similarity query to the multiple shards in parallel. At reference numeral 808, the device can aggregate search results from the multiple shards for return to a requesting client.

At reference numeral 810, the device can execute PFS data distribution logic to shard or partition the vector indexes and associated data objects across the multiple shards. Such can facilitate enabling higher throughput for ingestion, indexing, or retrieval for vector database operations. Method 800 can terminate or continue to insert A, which is further detailed in connection with FIG. 9.

Turning now to FIG. 9, exemplary method 900 is depicted. Method 900 can provide additional embodiments or elements relating to leveraging a PFS having an integrated V DAL to facilitate sharding or partitioning of vector indexes in accordance with certain embodiments of this disclosure.

At reference numeral 902, the device introduced at reference numeral 802 comprising at least one processor can generate the vector embedding of the associated data object. In some embodiments, said generation can be according to an in-band indexing operation that triggers in response to the data object being ingested by the parallel file system. In some embodiments, said generation can be according to an out-of-band indexing operation that occurs in response to a vector indexing agent scanning existing data objects on the parallel file system to generate the vector embedding.

At reference numeral 904, the device can instruct the metadata server to maintain an internal B-tree directory structure for the multiple shards. The B-tree directory structure can organize vector indexes in a manner that groups similar-valued vectors to enable an increased efficiency for range-based similarity queries.

At reference numeral 906, during updates to the vector indexes, the device can ensure atomicity, consistency, isolation, and durability of modifications to the vector embeddings and the associated data objects.

Example Operating Environments

Figure 10:
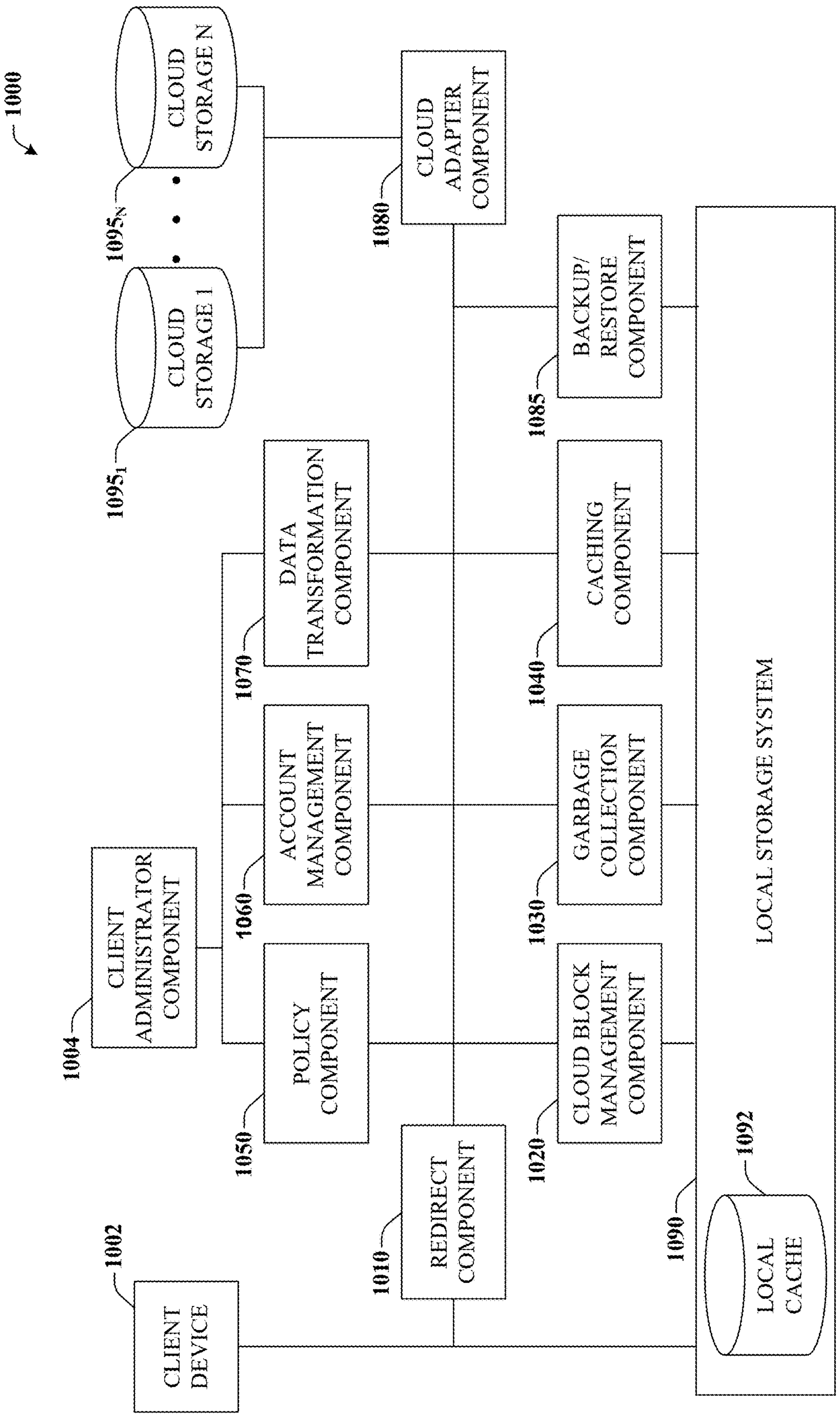
FIG. 10 illustrates a block diagram of an example distributed file storage system that employs tiered cloud storage in accordance with certain embodiments of this disclosure.
Figure 11:
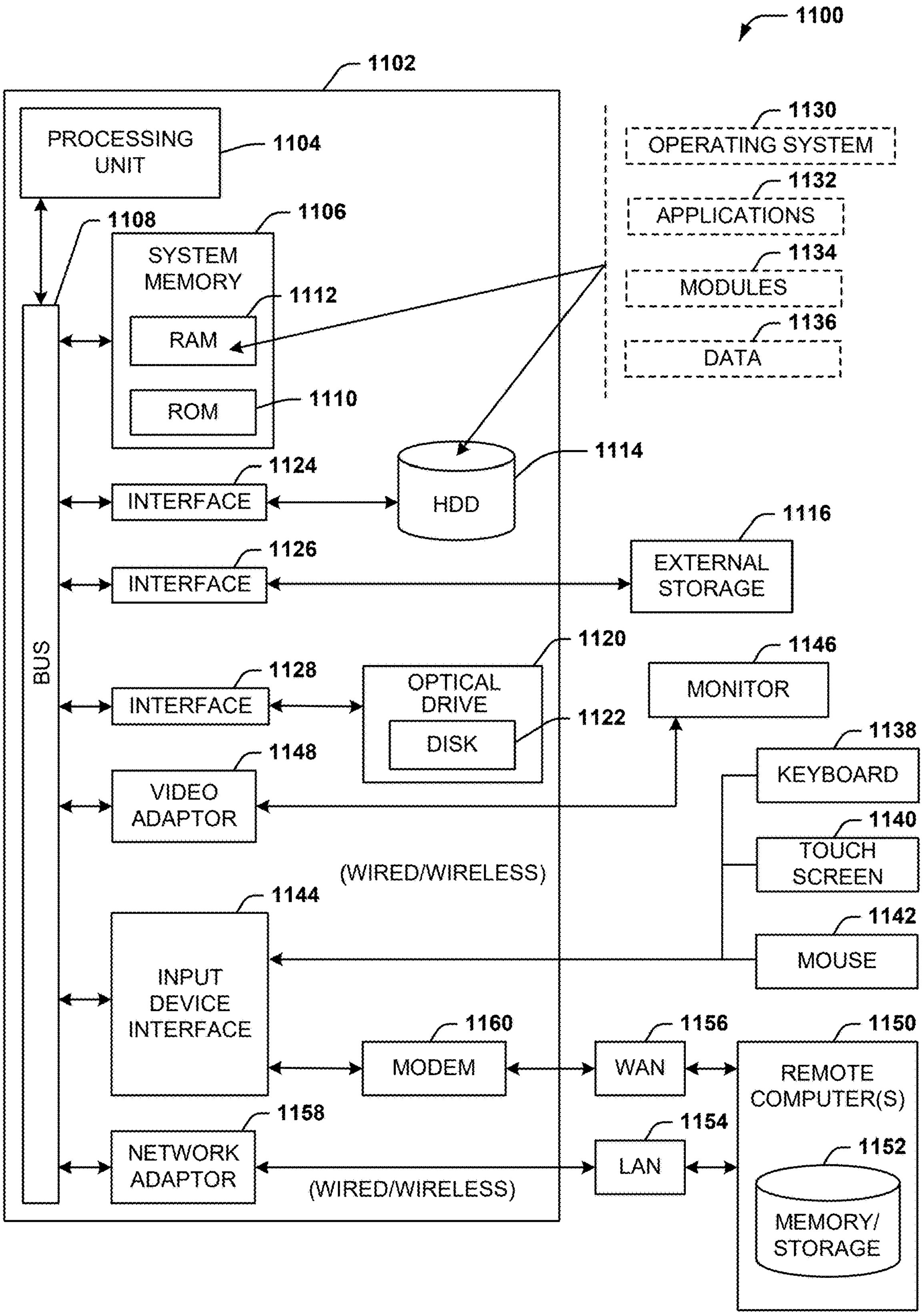
FIG. 11 illustrates an example block diagram of a computer operable to execute certain embodiments of this disclosure.

To provide further context for various aspects of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with aspects described herein.

Referring now to FIG. 10, there is illustrated an example local storage system including cloud tiering components and a cloud storage location in accordance with implementations of this disclosure. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 may use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 1095$_1$ and cloud storage N 1095$_N$, where N is a positive integer. It can be appreciated that multiple cloud storage locations can be used for storage including multiple accounts within a single cloud storage location as more fully described in implementations of this disclosure. Further, a backup/restore component 1085 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 9 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files that are tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on list of mappings it manages. For example, each stub can be associated with an account, and the cloud block management component 1020 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of A Pls. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1040 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 1085 can transfer a copy of the files within the local storage system 1090 to another cluster (e.g., target cluster). Further, the backup/restore component 1085 can manage synchronization between the local storage system 1090 and the other cluster, such that, the other cluster is timely updated with new and/or modified content within the local storage system 1090.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (V M) of multiple VM s hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1102.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at a 54 M bps (802.11a) data rate, and/or a 2.4 GHz radio band at an 11 Mbps (802.11b), a 54 M bps (802.11g) data rate, or up to a 600 M bps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (A SIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (A SIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

interfacing with a metadata server that maintains vector indexes associated with data objects of a vector database, wherein a vector index of the vector indexes relates to a similarity metric of an associated data object of the data objects used by the vector database;

using a parallel file system comprising a vector database abstraction layer (VDAL) to perform an accelerated similarity query, wherein the VDAL comprises a defined layer within the parallel file system that integrates vector indexing and similarity query coordination with core file system sharding and partitioning operations, wherein the VDAL further comprises vector embeddings used to describe the data objects, and wherein the parallel file system is configured to distribute different portions of the data objects and associated portions of the vector embeddings across multiple nodes or multiple shards of the parallel file system, the accelerated similarity query comprising:

in response to receiving a similarity query that references a vector embedding of the vector embeddings, broadcasting, via the VDAL, the similarity query to the multiple shards in parallel;

aggregating, via the VDAL, search results from the multiple shards for return to a requesting client; and leveraging, via the VDAL, data distribution logic to shard or partition the vector indexes and associated data objects across the multiple shards, enabling increased throughput applicable to ingestion, indexing, or retrieval for vector database operations.

2. The system of claim 1, wherein the parallel file system comprises:

a client side element installed on one or more of the multiple nodes of the parallel file system; and a server side element comprising the multiple shards and configured to store the data objects and associated vector embeddings in a distributed manner.

3. The system of claim 1, wherein the vector embeddings are respectively indicative of a vector of a multidimensional feature space associated with a respective data object, and wherein the vector indexes are respectively indicative of a similarity index based on an associated vector embedding.

4. The system of claim 1, wherein at least one of the vector embedding or the vector index is generated by a machine learning model or an artificial intelligence model:

in response to the associated data object being ingested to the parallel file system; or after ingestion in response to scanning the parallel file system via a lightweight vector indexing agent.

5. The system of claim 1, wherein the operations further comprise generating, via the VDAL, the vector embedding based on the associated data object and deploying the vector embedding in the VDAL.

6. The system of claim 1, wherein the operations further comprise generating the vector index based on an associated vector embedding and communicating the vector index to the metadata server.

7. The system of claim 1, wherein the operations further comprise leveraging a tagging subsystem configured to store one or more tags associated with the data objects, wherein the VDAL is configured to combine the similarity metric of the vector embedding with the one or more tags to perform a hybrid search that merges semantic similarity and attribute-based filtering.

8. The system of claim 1, wherein the multiple shards comprise respective B-tree directory structures that store and organize the vector indexes, the B-tree directory structures grouping similar-valued vector references for increased efficiency of range-based similarity queries.

9. The system of claim 1, wherein the parallel file system is configured to maintain atomicity, consistency, isolation, and durability-compliant transactions for vector index updates, ensuring atomic and consistent modifications of the vector embeddings and associated vector indexes.

10. The system of claim 1, wherein the operations further comprise leveraging a ranking aggregator subsystem configured to merge partial similarity search results from the multiple shards based on user-defined scoring or re-ranking functions before returning a final search result set to the requesting client.

11. The system of claim 1, wherein the data distribution logic allocates shards of the multiple shards among the multiple nodes based on dynamic load balancing associated with storage utilization or query throughput, autonomously adding or reassigning the shards when one or more defined thresholds are exceeded.

12. The system of claim 1, wherein the VDAL is configured to store vector embeddings and raw data in physically or logically adjacent locations, facilitating locality of reference for faster retrieval of corresponding data objects following a similarity match.

13. A method, comprising:

interfacing, by a device comprising at least one processor, with a metadata server that maintains vector indexes associated with data objects, wherein a vector index of the vector indexes relates to a similarity metric of an associated data object of the data objects used by a vector database;

using, by the device, a parallel file system comprising a vector database abstraction layer (VDAL) to perform an accelerated similarity query, wherein the VDAL comprises a defined layer within the parallel file system that integrates vector indexing and similarity query coordination with core file system sharding and partitioning operations, wherein the VDAL further comprises vector embeddings used to describe the data objects, and wherein the parallel file system is configured to distribute different portions of the data objects and associated portions of the vector embeddings or vector indexes across multiple nodes or multiple shards of the parallel file system;

in response to receiving a similarity query that references a vector embedding of the vector embeddings, broadcasting, by the device via the VDAL, the similarity query to the multiple shards in parallel;

aggregating, by the device via the VDAL, search results from the multiple shards for return to a requesting client; and executing, by the device via the VDAL, data distribution logic to shard or partition the vector indexes and associated data objects across the multiple shards, enabling higher throughput for ingestion, indexing, or retrieval for vector database operations.

14. The method of claim 13, further comprising, generating, by the device via the VDAL, the vector embedding of the associated data object: according to an in-band indexing operation that triggers in response to the associated data object being ingested by the parallel file system; or according to an out-of-band indexing operation that occurs in response to a vector indexing agent scanning existing data objects on the parallel file system to generate the vector embedding.

15. The method of claim 13, further comprising instructing, by the device, the metadata server to maintain an internal B-tree directory structure for the multiple shards, wherein the B-tree directory structure organizes vector indexes in a manner that groups similar-valued vectors to enable an increased efficiency for range-based similarity queries.

16. The method of claim 13, further comprising, during updates to the vector indexes, ensuring, by the device, atomicity, consistency, isolation, and durability of modifications to the vector embeddings and the associated data objects.

17. A non-transitory computer-readable medium comprising instructions that, in response to execution, cause a system comprising a processor to perform operations, comprising:

interfacing with a metadata server that maintains metadata records and vector indexes associated with data objects, wherein a vector index of the vector indexes relates to a similarity metric of an associated data object of the data objects used by a vector database;

leveraging a parallel file system comprising a vector database abstraction layer (VDAL) to perform an accelerated similarity query, wherein the VDAL comprises a defined layer within the parallel file system that integrates vector indexing and similarity query coordination with core file system sharding and partitioning operations, wherein the VDAL further comprises vector embeddings used to describe the data objects, and wherein the parallel file system is configured to distribute different portions of the data objects and associated portions of the vector embeddings across multiple nodes or multiple shards of the parallel file system;

in response to receiving a similarity query that references a vector embedding of the vector embeddings, broadcasting, via the VDAL, the similarity query to the multiple shards in parallel;

aggregating, via the VDAL, search results from the multiple shards for return to a requesting client; and executing, via the VDAL, data distribution logic to shard or partition the vector indexes and associated data objects across the multiple shards, enabling an increased throughput applicable to ingestion, indexing, or retrieval for vector database operations.

18. The non-transitory computer-readable medium of claim 17, wherein the operations further comprise:

attaching multiple tags to each of the data objects stored in the parallel file system; and performing a hybrid search combining the similarity metric of the vector embeddings with a tag-based filter to refine search results.

19. The non-transitory computer-readable medium of claim 17, wherein the operations further comprise load-balancing the multiple shards across the multiple nodes of the parallel file system based on at least one of: a current query volume, a capacity utilization threshold, or a measured read/write throughput metric.

20. The non-transitory computer-readable medium of claim 17, wherein the operations further comprise storing raw data objects and corresponding vector embeddings in adjacent physical or logical storage locations, resulting in increased retrieval performance when the similarity query requests the parallel file system to fetch a data object of the data objects associated with a matched vector embedding of the vector embeddings.

* * * * *